(12) United States Patent
Gally et al.

(10) Patent No.: US 7,923,697 B2
(45) Date of Patent: Apr. 12, 2011

(54) IMAGE SENSOR WITH ENHANCED SPATIAL RESOLUTION AND METHOD OF PRODUCING THE SENSOR

(75) Inventors: Daniel Gally, Bressieux (FR); Luc Berthier, Grenoble (FR)

(73) Assignee: Thales, Neuilly/sur/Seine (FR)

( * ) Notice: Subject to any disclaimer, the term of this patent is extended or adjusted under 35 U.S.C. 154(b) by 391 days.

(21) Appl. No.: 11/477,652

(22) Filed: Jun. 30, 2006

(65) Prior Publication Data
US 2007/0001121 A1 Jan. 4, 2007

(30) Foreign Application Priority Data

Jul. 1, 2005 (FR) ...................................... 05 07033

(51) Int. Cl.
*G01T 1/20* (2006.01)
*G01T 1/202* (2006.01)
(52) U.S. Cl. ................. 250/370.11; 250/368; 250/484.4; 250/486.1; 250/361 R; 378/98.8
(58) Field of Classification Search ............. 250/370.11, 250/483.1, 484.4, 486.1, 362–369, 370.12, 250/361 R, 336.1; 378/98.8; 427/160
See application file for complete search history.

(56) References Cited

U.S. PATENT DOCUMENTS

| | | | | |
|---|---|---|---|---|
| 4,398,118 A | * | 8/1983 | Galves et al. ................. | 313/527 |
| 4,658,141 A | * | 4/1987 | Wilt et al. ................. | 250/361 R |
| 4,803,366 A | * | 2/1989 | Vieux et al. ................ | 250/486.1 |
| 4,980,561 A | * | 12/1990 | Vieux et al. ................ | 250/486.1 |
| 4,985,633 A | * | 1/1991 | Vieux et al. ................ | 250/486.1 |
| 5,208,460 A | * | 5/1993 | Rougeot et al. ................ | 250/368 |
| 5,298,294 A | * | 3/1994 | Vieux et al. .................... | 427/583 |
| 5,399,185 A | * | 3/1995 | Berthold et al. ................ | 65/430 |
| 6,278,118 B1 | * | 8/2001 | Homme et al. .......... | 250/370.11 |
| 6,996,209 B2 | * | 2/2006 | Marek .......................... | 378/98.8 |
| 7,038,221 B2 | * | 5/2006 | Fuchs et al. ................ | 250/484.4 |
| 2001/0023924 A1 | * | 9/2001 | Takabayashi et al. .... | 250/361 R |
| 2002/0190214 A1 | * | 12/2002 | Wieczorek et al. ........... | 250/367 |
| 2003/0042424 A1 | | 3/2003 | Eberhard et al. | |
| 2004/0041099 A1 | * | 3/2004 | Gebele et al. ................ | 250/484.4 |
| 2004/0200973 A1 | * | 10/2004 | Ogawa ..................... | 250/370.11 |
| 2006/0197035 A1 | * | 9/2006 | Homme et al. ............ | 250/483.1 |

FOREIGN PATENT DOCUMENTS

EP 1 113 290 A2 7/2001

* cited by examiner

*Primary Examiner* — David P Porta
*Assistant Examiner* — Yara B Green
(74) *Attorney, Agent, or Firm* — Oblon, Spivak, McClelland, Maier & Neustadt, L.L.P.

(57) ABSTRACT

An image sensor includes a scintillator comprising a substrate covered with a layer of luminescent material, the layer of luminescent material comprising a first side in contact with the substrate and a second side, the surface of which has asperities, separated by interstices, a detection radiation emerging from the second side of the layer of luminescent material when the luminescent material is illuminated by a probe radiation through the substrate, characterized in that the second side of the layer of luminescent material is covered with a film of a coating material partially absorbing the detection radiation, and moulding itself to the asperities of the surface of the second side of the layer of luminescent material.

19 Claims, 5 Drawing Sheets

IMAGE SENSOR WITH ENHANCED SPATIAL RESOLUTION AND METHOD OF PRODUCING THE SENSOR

BACKGROUND OF THE INVENTION

The present invention relates to an image sensor. It also relates to a method of fabricating such a sensor. The invention is of particular use in the field of radiological imaging where the image sensors include a scintillator for converting a probe radiation, for example an X- or Gamma-range radiation, into a normally visible detection radiation.

Already known in the field of image sensors are electronic X-radiation sensors including radiological image intensifying screens disposed facing a detector and receiving an X-radiation. The detectors most commonly used are, in the field of radiology, cameras with targets, strip assemblies or matrices of charge-coupled devices (CCD), or even matrices of CMOS (Complementary Metal Oxide Semiconductor) detectors. These detectors are relatively ineffective for directly detecting X rays, which is why they are, for this purpose, often associated with scintillators for converting the X-range radiations into radiations in the spectrum of sensitivity of the detector, for example in the visible spectrum.

The material used to obtain the conversion, that is, the material of the scintillator, is often gadolinium oxysulphide. This is used in the form of a thin film, typically of the order of 50 to 300 micrometers. This film is made of particles of this material joined by a binder. The emission of visible light through the entire thickness, and in all the directions, of this material results in a loss of resolving power of the detector and therefore of the X-radiation sensor.

Thallium-doped caesium iodide CsI, in needle form, offers an interesting alternative for a greater light efficiency associated with a waveguide effect of the needles, the typical dimensions of the sections of which range from 3 to 6 micrometers. Implementations are thus known in which the scintillator of the input screen is made of caesium iodide deposited by vacuum evaporation onto a substrate, the evaporation possibly taking place on a cold or hot substrate. The needles are oriented perpendicularly to the surface of the substrate bearing them. They are only partially adjoined to each other. They thus offer a porosity of 20 to 25%. These pores, or interstices, filled with air, associated with the favourable refraction index of the CsI (1.78), provide a channelling of the visible photons emitted in each needle and give a higher sensitivity and resolving power.

FIG. 1 diagrammatically represents a radiological image sensor comprising a scintillator 1, and a detector 2. The scintillator 1, comprises a substrate 3, for example made of carbon, covered with a layer of a luminescent material 4, for example caesium iodide, which takes the form of needles 5 (or asperities). The detector 2, for example a strip of charge-coupled devices, comprises elements 6 sensitive to the visible radiation. The thickness of the layer of luminescent material 4 is constant over all the surface of the substrate.

The substrate 3 receives a stream of X photons (probe radiation) symbolized by solid-line vertical arrows. Broken lines in the figure represent examples of paths 10, 11, followed in the needles 5 of caesium iodide, by the visible radiation corresponding to the incident X photons. The visible radiation (detection radiation) emerging from the luminescent material 4, illuminates the detector 2. The normal paths 10 have a direction roughly parallel to that of the X photons, and they emerge from the scintillator via the ends of the needles 5 made of caesium iodide. There is also lateral diffusion of the visible radiation carried in the needles 5 made of caesium iodide, as is indicated in the figure by the reference 11.

The light efficiency of the scintillator is defined as the ratio between the energy of the incident probe radiation on the scintillator and the energy of the detection radiation emitted by the scintillator.

The spatial resolution of the radiological image sensor depends on the capacity of the needles 5 of caesium iodide to effectively channel the visible radiation. This capacity is a function of the thickness of the layer of luminescent material 4. An increase in the thickness of the layer of luminescent material 4 results in a deterioration of the spatial resolution of the radiological image sensor.

Moreover, when the sensitive elements 6 of the detector 2 are illuminated by a visible radiation, the sensitive elements 6 create electrons which they store temporarily within themselves, in order for them to be converted into an electrical image outside the detector. The sensitive elements 6 have an electron storage capacity which can, in certain cases, be less than the number of electrons generated by a visible radiation emitted locally by the scintillator 1. To avoid local saturations of stored electrons resulting in saturations on the electrical image, it may be necessary either to modify the spectrum of the visible radiation arriving on the detector 2, or even to attenuate the energy of the visible radiation emitted by the luminescent material 4, which is tantamount to reducing the light efficiency of the scintillator.

SUMMARY OF THE INVENTION

The invention is advantageous when the level of visible radiation emitted by the scintillator 1 has to be reduced to adapt it to the storage capacity of the sensitive elements 6, of the detector 2, and at the same time improve the spatial resolution of the image sensor.

A known solution for reducing the level of visible radiation emitted by the scintillator 1 consists in covering the luminescent material 4 with a filter 8, made of a very fine metallic film. However, creating the film 8 is costly, and the application method takes a long time. This method is, moreover, difficult to finalize to obtain a low attenuation of the detection radiation which is uniform over all the surface of the scintillator 1. Moreover, applying a filter 8 to the scintillator 1 does not enhance the spatial resolution of the X-ray sensor.

One significant object of the invention is therefore to solve the problem posed by adapting the energy of the visible radiation arriving on the detector and enhancing the spatial resolution of the image sensor.

To achieve this object, the invention proposes an image sensor including an input screen scintillator comprising a substrate covered with a layer of luminescent material, the layer of luminescent material comprising a first side in contact with the substrate and a second side, the surface of which has asperities, separated by interstices, a detection radiation emerging from the second side of the layer of luminescent material when the luminescent material is illuminated by a probe radiation through the substrate, characterized in that the second side of the layer of luminescent material is covered with a film of a coating material partially absorbing the detection radiation, and moulding itself to the asperities of the surface of the second side of the layer of luminescent material.

Another object of the invention is to devise a method of fabricating an image sensor according to one of the preceding claims, characterized in that the film of coating material is deposited on the surface of the needles in at least one operation, the operation comprising a first step of slow immersion of the layer of luminescent material in a coating solution including a solvent that is inert relative to the material of the substrate, to the luminescent material and the coating material, the coating solution having a low surface energy, followed by a second step of evaporation of the solvent in dry vapour phase.

Compared to the state of the art described above, the invention offers a two-fold advantage:
an improved spatial resolution;
a simple application method.

The improvement in spatial resolution is very substantial: for example, the increase in the value of the modulation transfer function can be of the order of 30% at the spatial frequency of eight pairs of lines per millimeter. The uniformity of the attenuation of the light efficiency on the surface of the scintillator is ideal for the application and, finally, the reproducibility of the method is a major advantage for the large-scale production of the scintillators.

The simplicity of the application method results in a low equipment investment cost, a reduced application time and a risk of failure of the application equipment far lower than those needed to implement the vacuum deposition technique, for example.

BRIEF DESCRIPTION OF THE DRAWINGS

Other characteristics and advantages of the invention will become apparent from reading the detailed description that follows, given as an example and with reference to the appended drawings in which.

DETAILED DESCRIPTION OF THE INVENTION

To make it easier to read the description, the same identifiers will denote like elements in the different figures.

Figure 2:
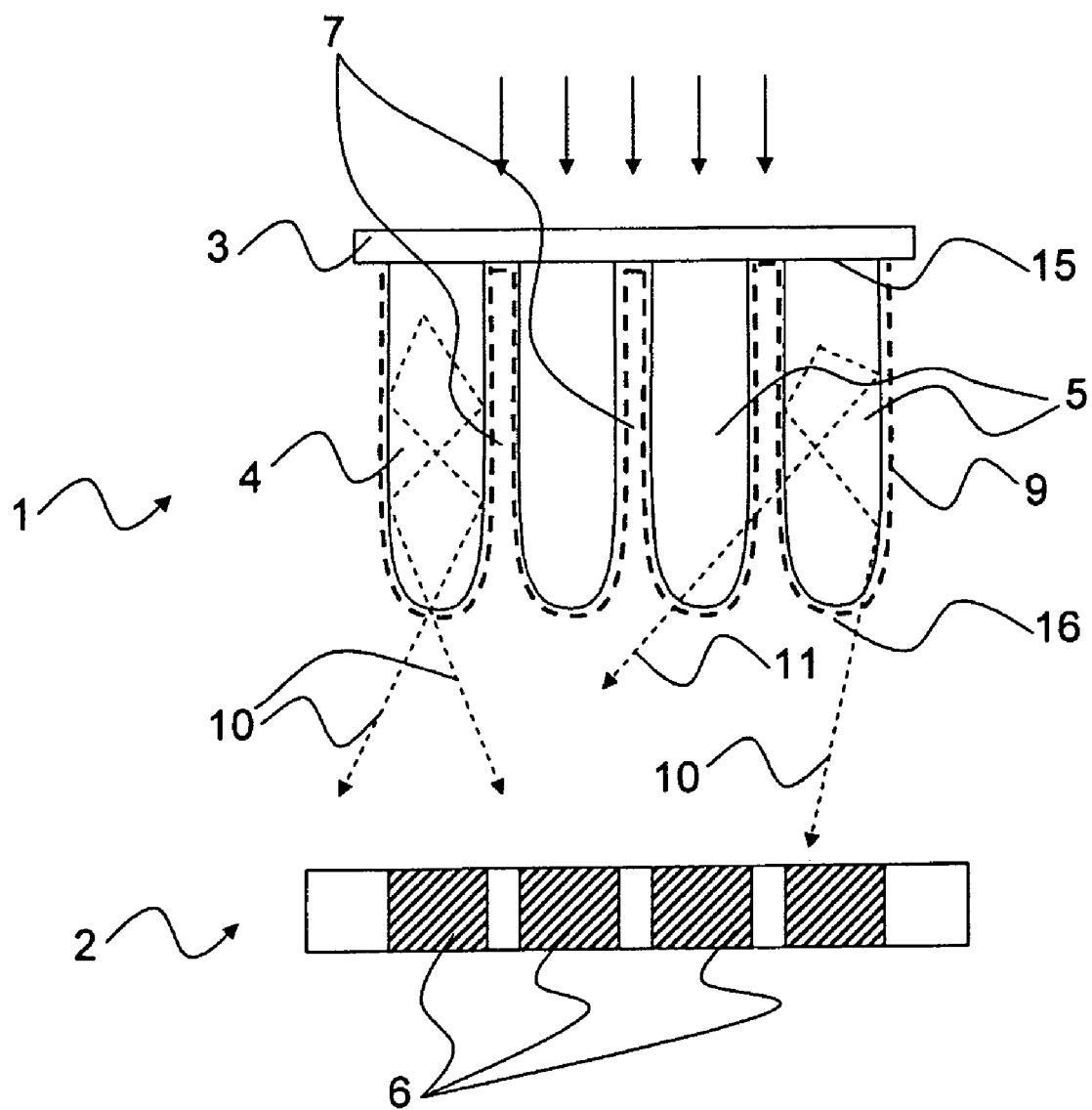
FIG. 2 shows an image sensor according to the invention, including a scintillator.

FIG. 2 diagrammatically represents an image sensor according to the invention, the image being formed from a probe radiation, comprising a radiation sensor input screen scintillator 1.

The scintillator 1 comprises a substrate 3, one side of which is covered by a layer of a luminescent material 4. The layer of luminescent material 4 is roughly parallel to the substrate 3. A first side 15 of the layer of luminescent material 4 is in contact with the substrate 3. A second side 16 of the layer of luminescent material 4 has a columnar-type surface structure, which can be obtained using vacuum evaporation techniques. The second side 16 comprises, on its surface, a very large number of asperities 5, for example taking the form of needles. Each of the needles 5 has a first end in contact with the substrate 3 and a second end. The second ends of the needles 5 form the asperities 5 of the second side 16 of the layer of luminescent material 4.

In another embodiment of the sensor according to the invention, the asperities 5 of the scintillator 1 are formed by clusters of grains of powder. In this case, the luminescent material 4 is deposited on the substrate 3 in powder form.

The asperities that form the second side of the layer of luminescent material 4 are separated by interstices 7. The diameter of the interstices forms one of their characteristic dimensions. The average diameter of the interstices 7 is less than the average diameter of the asperities 5, in other words, the luminescent material 4 has a compactness of less than unity. For example, the compactness of the luminescent material 4 has a value between 0.4 and 0.9.

When a probe radiation penetrates into the layer of luminescent material 4, passing through the substrate 3, the luminescent material 4 produces a detection radiation 10, 11 which emerges from the layer of luminescent material 4 preferably via the second ends of the needles 5.

The probe radiation is, for example, of X- or Gamma-radiation type, and the detection radiation is, for example, of visible radiation type.

Figure 1:
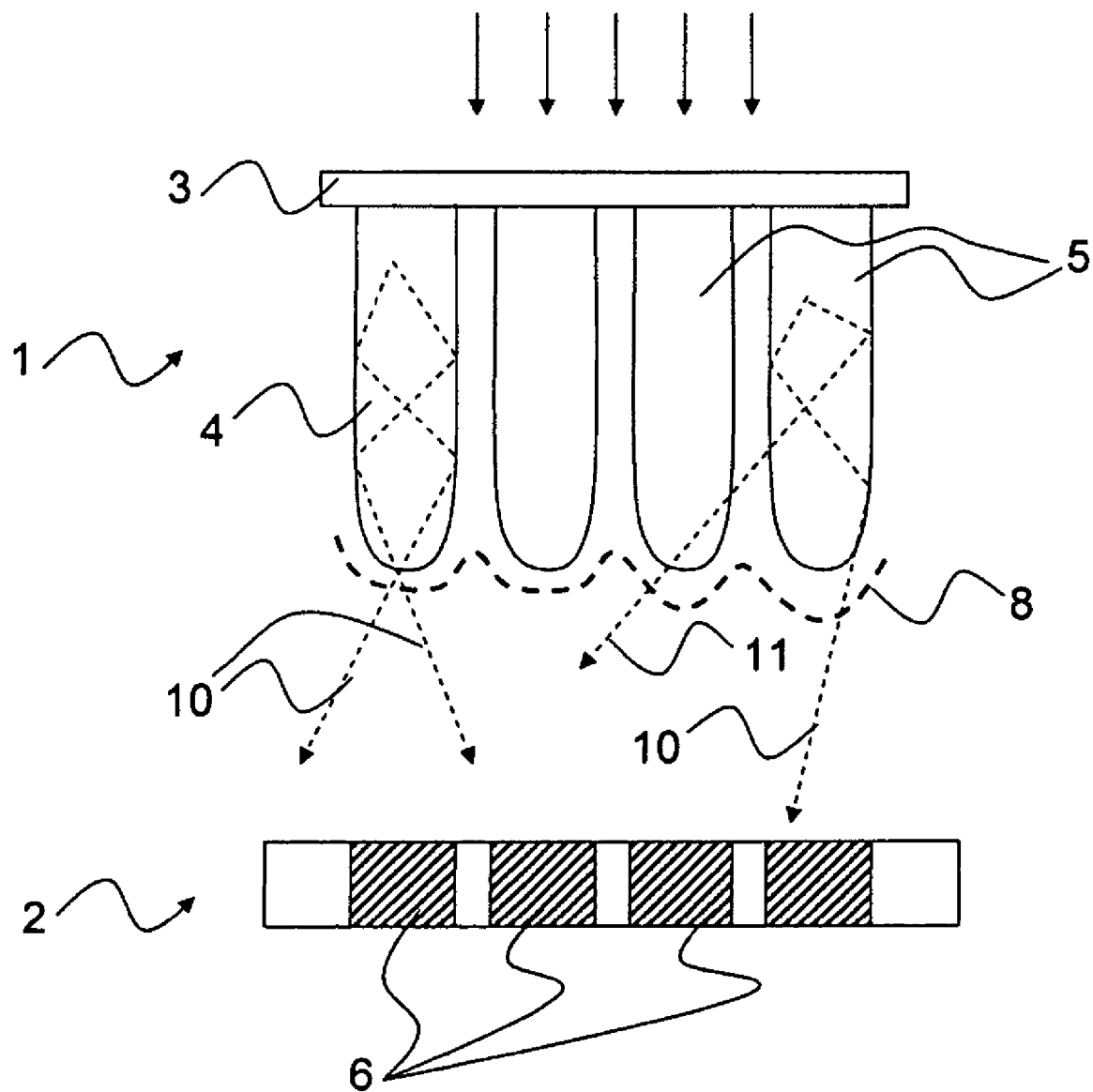
FIG. 1, already described, shows an image sensor according to the prior art, the images being formed from a probe radiation.

The scintillator 1, shown in FIG. 2, is differentiated from that represented in FIG. 1 by the fact that the filter 8 is replaced by a coating material 9. The coating material 9 is very closely moulded to the form of the asperities 5 of the layer of luminescent material 4.

In particular, the whole of the columnar-type surface structure (needle or powder grain) is covered with a film of coating material 9.

The detection radiation which, in FIGS. 1 and 2, bears the reference 10, has a direction similar to that of the incident probe radiation on the substrate, and it carries a detection signal to the second ends of the needles 5. Conversely, the detection radiation which, in FIGS. 1 and 2, bears the reference 11, follows directions very different from those of the probe radiation and does not emerge from the layer of luminescent material 4 via the second ends of the needles 5; the term "oblique radiation" is used hereinafter. The existence of a detection radiation 11 degrades the spatial resolution of the radiological image sensor.

In FIG. 2, the detection radiation 10 passes once through the film of coating material 9. The oblique nature of the paths of the detection radiation 11 forces the detection radiation 11 to pass several times through the film of coating material 9 before arriving on the sensitive elements 6 of the detector 2. When the film of coating material 9 has the property of partially absorbing the detection radiation, the radiation energy 11, emerging from the luminescent material 4, is significantly more attenuated than that of the radiation 10, which benefits the spatial resolution of the radiological image sensor.

In FIG. 2, the path of the detection radiation 11 shown passes three times through the film of coating material. For example, if the film of coating material 9 absorbs 50% of the detection radiation on each passage, the detection radiation 10 is attenuated by $\tau_1=50\%$ on its arrival on the detector 2, and the oblique radiation 11 is attenuated by $\tau_2=1-\tau_1\times\tau_1\times\tau_1=87.5\%$ on its arrival on the detector 2.

Figure 3:
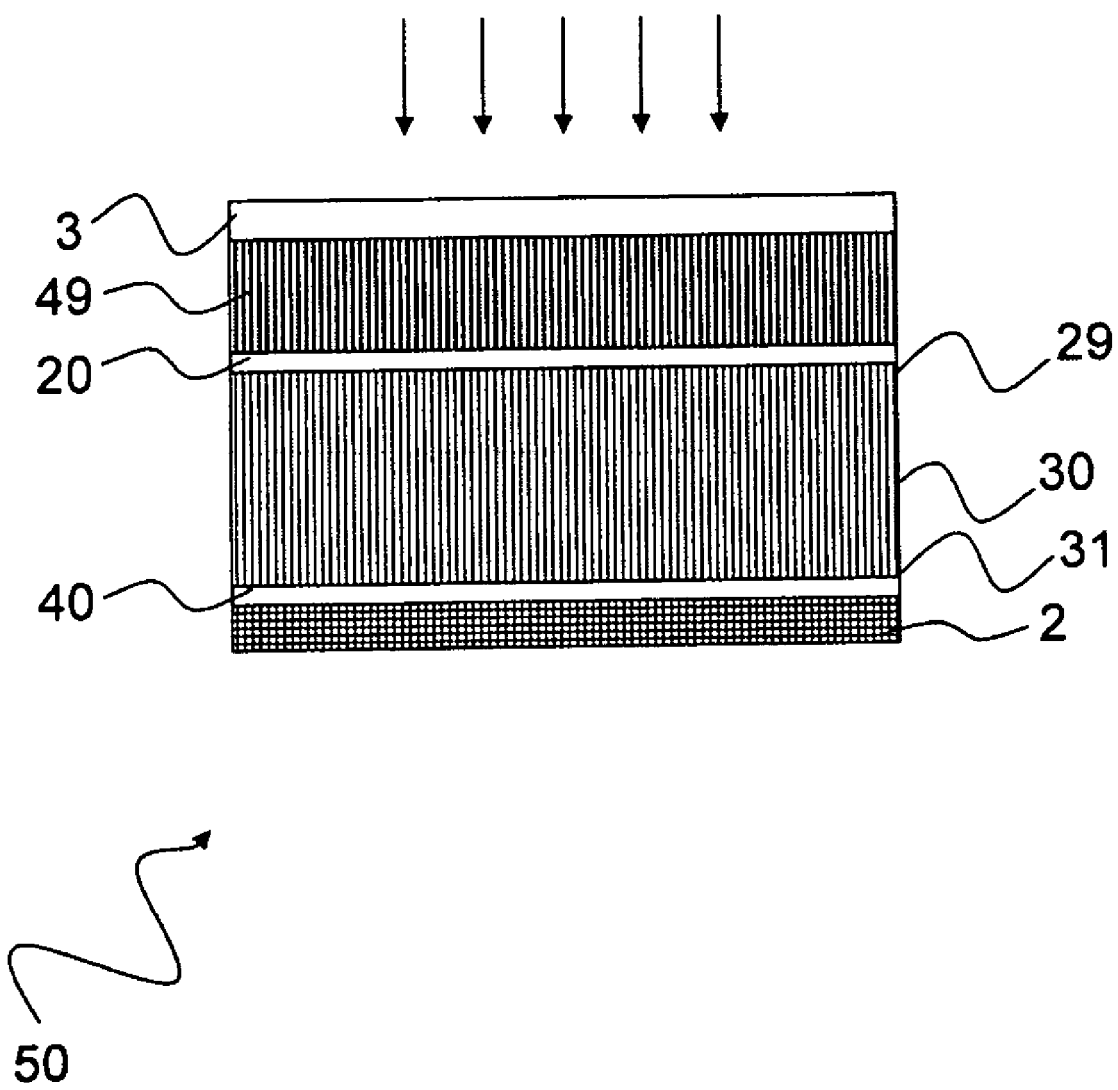
FIG. 3 shows, in cross section, a second embodiment of an image sensor according to the invention.

FIG. 3 diagrammatically and in cross section represents a second embodiment of an image sensor according to the invention, including a scintillator 1 and capable of being used for radiological examinations, for example mammograms.

The image sensor 50 has a stratified structure. The top stratum is the substrate 3, for example made of carbon, which receives a probe radiation on a first side. On a second side of the substrate there is deposited, for example by vacuum deposition, a layer 49 comprising a luminescent material, the surface state of which has asperities, covered with a film of a coating material partially absorbing the detection radiation and very closely moulded to the structure of the surface of the luminescent material. One side of this layer 49 is coupled by gluing to a first end 29 of a bundle of optical fibres 30, which can carry a detection radiation. A second end 31 of the optical fibre bundle is also fixed by gluing to a detection radiation detector 2, for example a strip of charge-coupled devices.

When the layer of luminescent material 4 is illuminated by a probe radiation through the substrate 3, the layer of luminescent material 4 produces a detection radiation 10, 11. The detection radiation 10, 11 that emerges from the luminescent material passes through the film of coating material 9, and a fine thickness of glue 20, to enter into the bundle of optical fibres 30. On leaving the bundle of optical fibres, the detection radiation 10, 11 passes through another thickness of glue 40, before driving the sensitive elements 6 of the detector 2 which delivers an electrical image.

Figure 4:
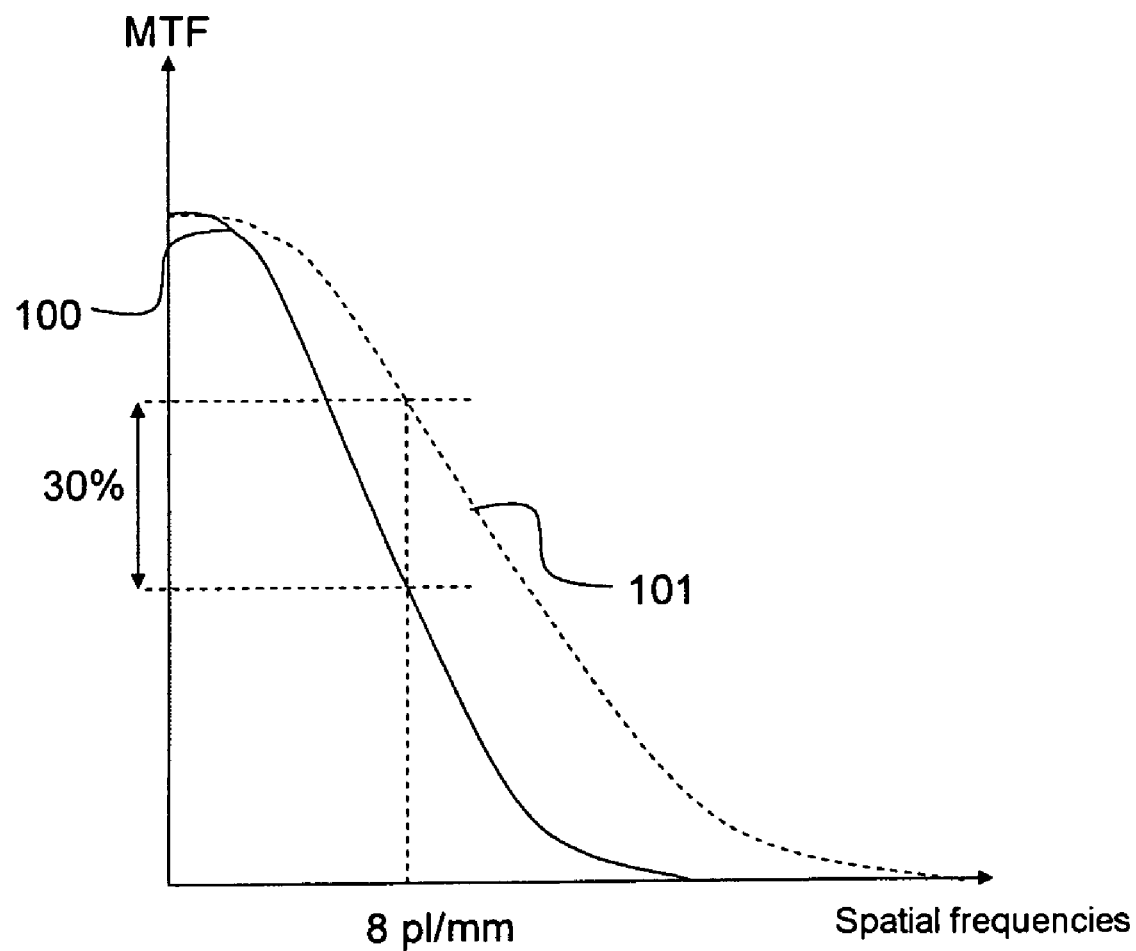
FIG. 4 represents two curves showing the improvement in the modulation transfer function (MTF) imparted by the invention.

In FIG. 4, the curves 100 and 101 show, according to the spatial frequency, that the modulation transfer function (MTF) is higher in the case of the image sensor according to the invention (curve 101) than in the case of an image sensor according to the prior art (curve 100). For example, the increase in modulation at a spatial frequency of eight pairs of lines per millimeter (pl/mm) is as high as 30% whereas the attenuation of the energy of the detection radiation arriving on the detector, caused on the probe radiation 10 by the film of coating material 9, is $\tau_1$=50%.

To produce a scintillator 1 used in an image sensor according to the invention, the scintillator 1, comprising a substrate 3, covered on one side by a luminescent material 4, is immersed in a coating solution comprising coating material 9 and a solvent. The immersion of the scintillator 1 for a brief time is a way of diffusing the coating material 9 into the asperities of the second side of the layer of luminescent material 4.

In an embodiment of the image sensor according to the invention, the coating material 9 of the scintillator 1 has an organic colorant.

In another embodiment of the image sensor according to the invention, the coating material 9 of the scintillator 1 has a finely-divided mineral colorant, and the coating material 9 has a particle size less than the average diameter of the interstices 7, which enables it to closely cover the surface of the asperities 5, forming the surface structure of its second side 16.

In an embodiment of the image sensor according to the invention, the luminescent material 4 of the scintillator 1 includes an alkaline salt and the coating material 9 includes the colorant bearing the reference of the USA-based ALDRICH company, CAT 19966-4, mixed with cyclohexane in a concentration of two grams per liter of cyclohexane.

The scintillator 1 is then slowly extracted from the coating solution to avoid the formation of traces, and is then dried. Once dry, the coating material 9 is spread in a fine film over the surface of the asperities 5 of the layer of luminescent material 4.

The average thickness of the film of coating material is less than ten nanometers.

The surface energy of a liquid, also called surface tension, characterizes the aptitude of the surface of a liquid to take the smallest possible value in a given medium. It also characterizes the cohesion of a liquid since the cohesion forces internal to the latter must be overcome to raise this surface. Mechanically, it is expressed as a force opposing a surface raise and related to the length unit. The unit used is N/m.

The film of coating material 9 is deposited on the second side 16 of the layer of luminescent material 4, in at least one operation, the operation comprising a first step for the slow immersion of the layer of luminescent material 4 in a coating solution comprising a solvent that is inert relative to the material of the substrate 3 and to the luminescent material 4, and the coating material 9, the coating solution having a low surface energy, followed by a second step for the evaporation of the solvent in dry vapour phase.

Figure 5:
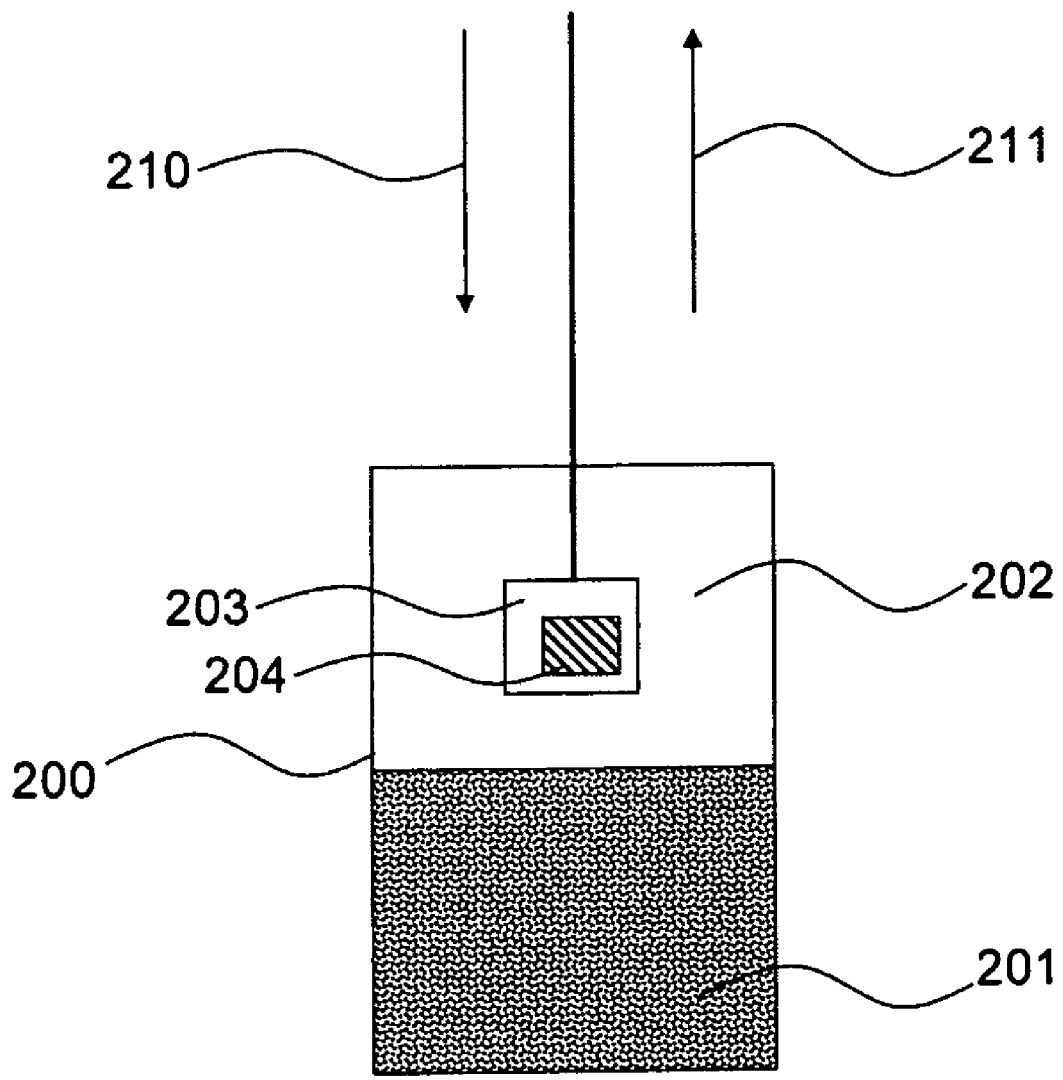
FIG. 5 represents a device for implementing the method of producing an image sensor according to the invention and, in particular, a scintillator used in the image sensor.

FIG. 5 diagrammatically represents a device 199 for producing a scintillator 1 used in an image sensor according to the invention. The device 199 comprises:
- a sample, 204;
- a tank 200;
- a sample-holding plate 203.

The sample 204 is formed by a substrate, one side of which is covered with a layer of luminescent material 4.

The tank 200, moulded so that the sample can be introduced into the tank, is filled to mid-height with a coating solution. The coating solution can be a colorant product mixed in a solvent. The quantity of coating solution placed in the tank is chosen such that the depth of the coating solution 201 is sufficient to immerse all the sample 204 in the coating solution. A bottom part of the tank contains the coating solution, a top part of the tank forms a dry vapour drying zone 202.

The sample-holding plate 203 supports the sample 204. The contacts between the sample 204 and the sample-holder 203 are very small. The plate 203 can be animated by a slow vertical translation movement. In a slow downward movement 210 the plate 203 progressively immerses the sample 204 in the coating solution to obtain a good uniform colouring. After a short immersion of the sample 204, the plate 203, in an upward movement 211, slowly raises the sample 204 from the bottom part of the tank to the top part of the tank. In this way, any retention of solvent on the surface of the sample 204 is avoided, and its elimination is very uniform. The duration of the immersion of the sample 204 in the coating solution, of the order of a few minutes, determines the value of the attenuation of the detection radiation and therefore determines the value of the light efficiency of the scintillator 1. The matching of the light efficiency to the required value can be obtained by successive reductions obtained by repetition of an operation comprising, in turn, a step for immersion in the coating solution and a drying step.

In a true solution, a material is dissolved in a solvent and is divided throughout the solvent, forming with it a uniform phase. Among other characteristic properties, such a solution passes through the finest filters without separation. The size of the dissolved particles (molecules or ions) ranges from 0.1 to a few nanometers.

In an embodiment of the method of fabricating the scintillator 1 used in an image sensor according to the invention, the coating material 9 behaves as a true solution in the solvent.

In an embodiment of the method of fabricating the scintillator 1 according to the invention, where the coating material is deposited in powder form, the finely divided coating material 9 behaves as a stable solution in the solvent.

In another embodiment of the method of fabricating the scintillator 1 according to the invention, the solvent includes cyclohexane.

The invention claimed is:

1. An image sensor including an input screen scintillator comprising:
    a substrate partially covered with needles made of a luminescent material, each of the needles having a base in contact with the substrate, a tip, and a sidewall extending from the base to the tip and being separated from adjacent needles by interstices, a detection radiation emerging from the surface of the needles when the base of the needles is illuminated by a probe radiation through the substrate, wherein the surface of the needles is covered from the base to the tip on all sides of the sidewall with a film of a coating material partially absorbing the detection radiation, leaving the interstices between the tips of adjacent needles and the interstices between at least a portion of the sidewalls of adjacent needles uncovered.

2. The image sensor according to claim 1, wherein a layer formed by the needles of the scintillator has a columnar-type structure.

3. The image sensor according to one of claims 1 or 2, wherein the luminescent material of the scintillator is deposited on the substrate in powder form.

4. The image sensor according to claim 1, wherein the probe radiation is of X-radiation type.

5. The image sensor according to claim 1, wherein the probe radiation is of Gamma radiation type.

6. The image sensor according to claim 1, wherein the detection radiation is of visible radiation type.

7. The image sensor according to claim 1, wherein the luminescent material is thallium-doped caesium iodide.

8. The image sensor according to claim 1, wherein the average thickness of the film of coating material of the scintillator is less than ten nanometers.

9. The image sensor according to claim 1, wherein the coating material of the scintillator has an organic colorant.

10. The image sensor according to claim 1, wherein the coating material of the scintillator has a finely-divided mineral colorant, and the coating material has a particle size less than the average diameter of the interstices to enable the coating material to closely cover the surface of the needles.

11. The image sensor according to claim 10, wherein the luminescent material of the scintillator includes an alkaline salt and the coating material includes colorant Sudan Black B.

12. Method of fabricating an image sensor according to claim 1, wherein the film of coating material is deposited on the surface of the needles in at least one operation, the operation comprising a first step of slow immersion of the layer of luminescent material in a coating solution including a solvent that is inert relative to the material of the substrate, to the luminescent material and the coating material, the coating solution having a low surface energy, followed by a second step of evaporation of the solvent in dry vapor phase.

13. The method according to claim 12 wherein the coating material of the scintillator has a finely-divided mineral colorant, and the coating material has a particle size less than the average diameter of the interstices, which enables it to closely cover the surface of the needles, and the coating material behaves as a true solution in the solvent.

14. The method according to claim 12 wherein the coating material of the scintillator has a finely-divided mineral colorant, and the coating material has a particle size less than the average diameter of the interstices, which enables it to closely cover the surface of the needles, and the finely-divided coating material behaves as a stable solution in the solvent.

15. The method according to claim 12 wherein the coating material of the scintillator has a finely-divided mineral colorant, and the coating material has a particle size less than the average diameter of the interstices, which enables it to closely cover the surface of the needles, the luminescent material of the scintillator includes an alkaline salt and the coating material includes colorant Sudan Black B, and the solvent includes cyclohexane.

16. A method of fabricating an image sensor comprising:

depositing a film of coating material on a surface of needles, each of the needles having a base, a tip, and a sidewall and being separated from adjacent needles by interstices, partially covering a substrate at the base of the needles and leaving the interstices between the tips of adjacent needles and interstices between at least a portion of the sidewalls of adjacent needles uncovered, the coating material partially absorbing detection radiation emerging from the surface of the needles when the base of the needles is illuminated by a probe radiation through the substrate and the depositing comprising:

immersing, slowly, a layer of luminescent material in a coating solution including a solvent that is inert relative to a material of the substrate, the luminescent material and the coating material, the coating solution having a low surface energy; and evaporating the solvent in a dry vapor phase.

17. The method of claim 16, wherein the coating material has a finely-divided mineral colorant, and the coating material has a particle size less than an average diameter of interstices separating the needles to enable the coating material to closely cover the surface of the needles, and the coating material behaves as a true solution in the solvent.

18. The method of claim 16, wherein the coating material has a finely-divided mineral colorant, and the coating material has a particle size less than an average diameter of interstices separating the needles to enable the coating material to closely cover the surface of the needles, and the finely-divided coating material behaves as a stable solution in the solvent.

19. The method of claim 16, wherein the coating material has a finely-divided mineral colorant, and the coating material has a particle size less than an average diameter of interstices separating the needles to enable the coating material to closely cover the surface of the needles, the luminescent material includes an alkaline salt and the coating material includes colorant Sudan Black B, and the solvent includes cyclohexane.

* * * * *